United States Patent Office 3,279,897
Patented Oct. 18, 1966

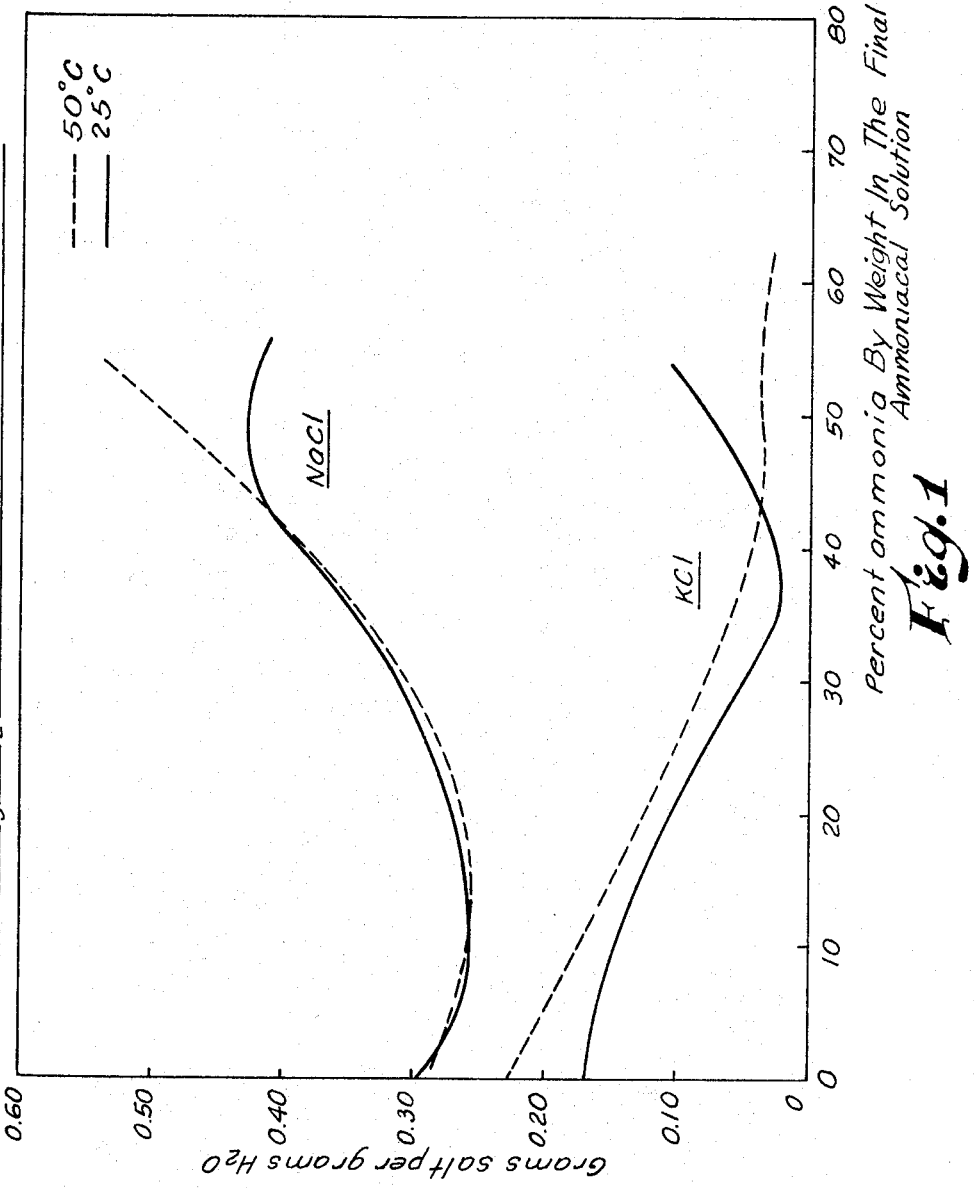

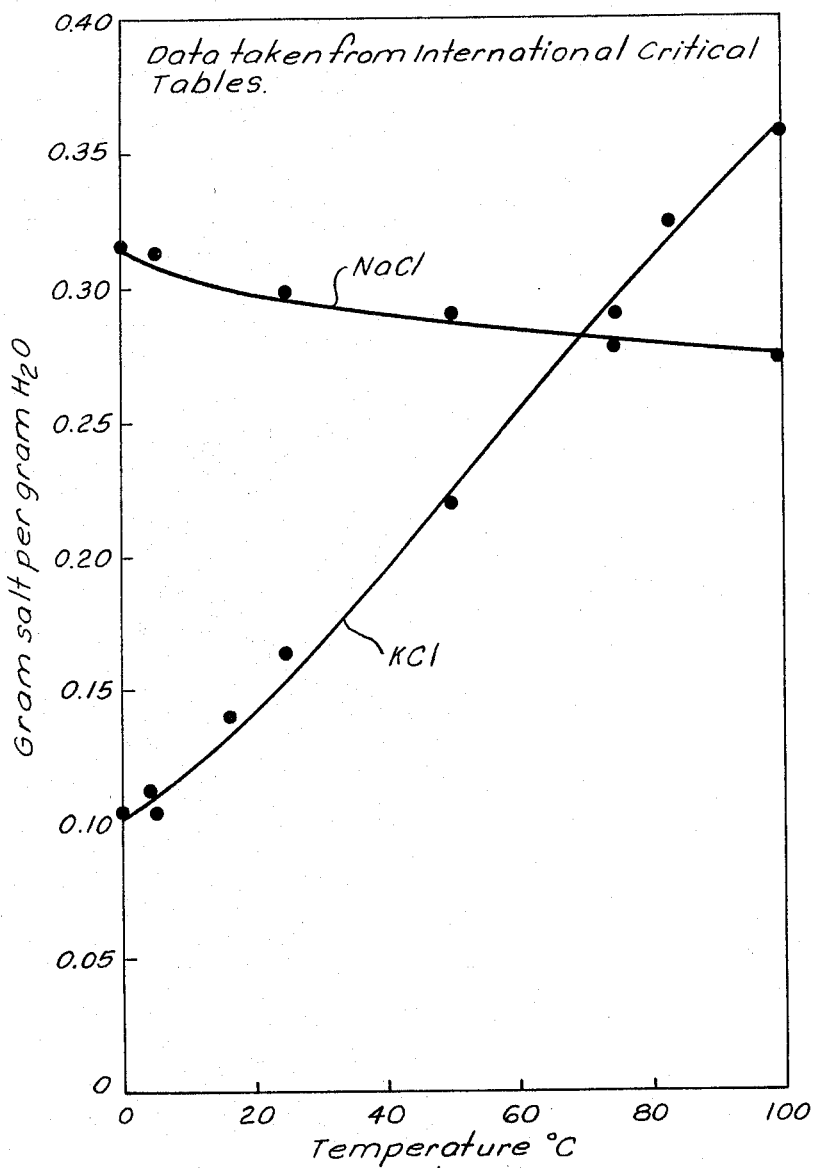

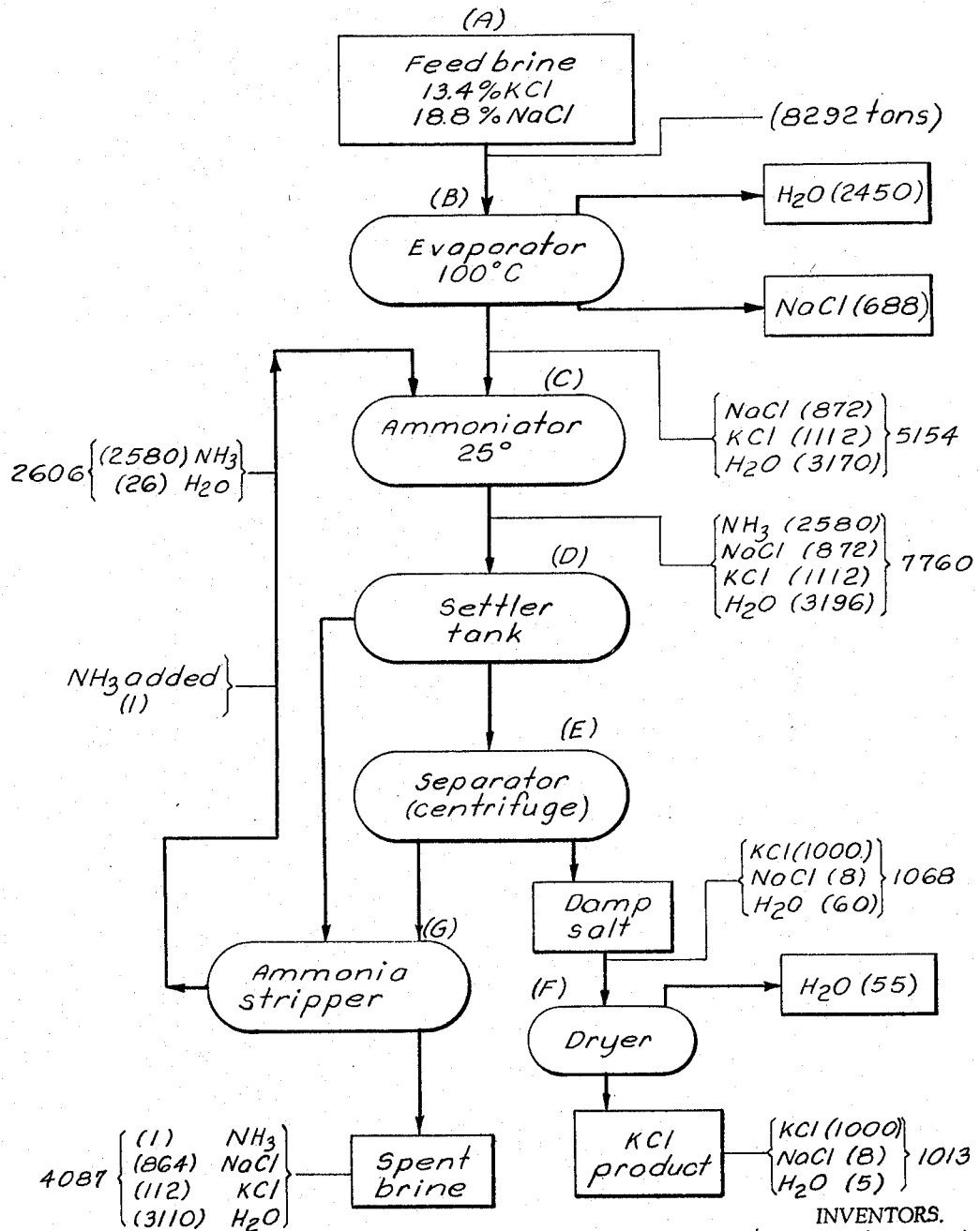

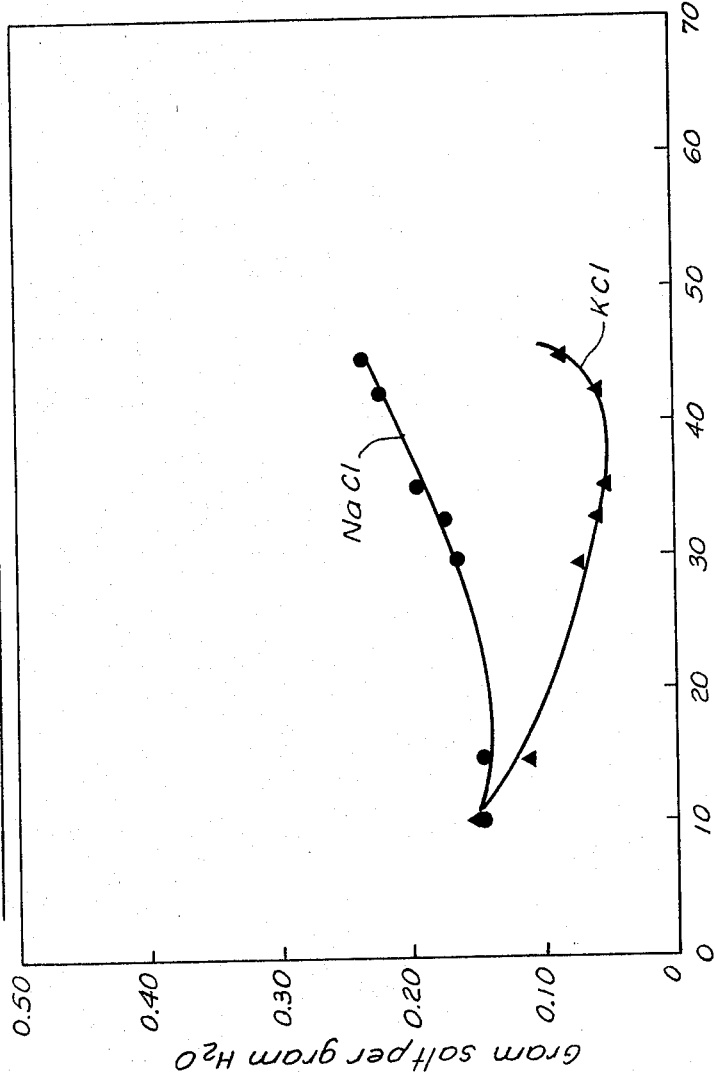

3,279,897
SELECTIVE PRECIPITATION OF POTASSIUM
CHLORIDE BY ADDITION OF AMMONIA
Robert D. Goodenough, Midland, Mich., and Adam Harry
Klopf, Cleveland, Ohio, assignors to The Dow Chemical Company, Midland, Mich., a corporation of Delaware
Filed Nov. 4, 1964, Ser. No. 409,006
9 Claims. (Cl. 23—302)

This application is a continuation-in-part of our co-pending application Serial No. 261,512, filed February 27, 1963, now abandoned, for "Recovery of Potassium Chloride."

This invention relates to a process for the recovery of potassium chloride from aqueous mixtures containing primarily both sodium chloride and potassium chloride.

A principal object of the present invention is to provide a novel process for the recovery of solid potassium chloride, substantially free of solid sodium chloride, from aqueous sodium and potassium chloride mixtures.

In general, it has been found that by ammoniating water-soluble compositions containing both sodium chloride (NaCl) and potassium chloride (KCl) under particular novel reaction conditions, an unexpected substantial amount of potassium chloride is forced out of solution. The recovered potassium chloride is readily separated such as, for example, by filtration and recovered in high yield. The so-recovered product can be washed to remove therefrom substantially any sodium chloride and other alkali and alkaline earth salt impurities from the original potassium chloride solution, which may be occluded or sorbed thereto.

More particularly in the quaternary system,

$$NaCl\text{-}KCl\text{-}NH_3\text{-}H_2O$$

it has been unexpectedly found that over a specific ammonia concentration range, as the ammonia concentration increases, the solubility of potassium chloride becomes extremely suppressed and nearly approaches zero. Concurrently therewith, however, after a small initial decrease in solubility at low ammonia concentration over the operable range of the present invention, the solubility of sodium chloride is enhanced and increases with the increase in ammonia concentration. It is with respect to this unexpected suppressed solubility of potassium chloride and enhanced solubility of sodium chloride in the aforesaid system that the present method is based.

The following figures illustrate the basis as well as the application of the present invention and will be discussed more fully hereinafter.

FIG. 1 of the appended drawing shows the surprising solubility characteristics of sodium chloride and potassium chloride in an ammoniacal solution at various temperatures and at various ammonia concentrations.

FIG. 2 shows the solubility characteristics of sodium chloride and potassium chloride in an ammonia-free system at a particular temperature.

FIG. 3 is a flow diagram showing one embodiment, on a tons-per-day basis, of the present invention, for recovering potassium chloride from a production brine derived from solution mining of Sylvinite ore.

FIG. 4 is a graph presentation for comparative purposes showing the solubility characteristic of sodium chloride and potassium chloride at various ammonia concentrations and at a given temperature of a dilute solution of said salts.

The present invention consists of a process for recovering solid potassium chloride from aqueous ammoniacal mixtures containing both sodium and potassium chloride which comprises admixing gaseous or liquid ammonia with an initial aqueous feed mixture primarily of said chlorides to provide a final aqueous ammoniacal solution containing from about 10 to about 45 weight percent ammonia at a temperature broadly within a range characterized by the freezing point of the feed mixture as a lower limit and the critical disassociation temperature of the ammonia as the higher limit, thereby to provide solid potassium chloride in the aqueous mixture. The solid potassium chloride so-recovered from solution in this manner is separated from the reaction mixture. Ordinarily, this product so-separated is washed with water to render the recovered salt substantially free of sodium ions and the like.

Preferably, the ammonia will be introduced into a saturated aqueous salt mixture to be treated in an amount, for example, by bubbling, to produce in the final solution a concentration by weight thereof of from about 20 to 45 percent, the temperature being within the range of from about 0° C. to about 100° C., and more preferably from about 25° C. to about 50° C., with the weight concentration of ammonia in the resulting final aqueous solution composition being from about 30 to about 45 percent.

To obtain the requisite concentration of ammonia in the final solution, within the range of from 10 to 45 percent, correspondingly from about 11 to about 82 pounds ammonia per 100 pounds of aqueous feed mixture will be added, the amount to be added being in a substantially increasing relationship to the temperature increase within the above-specified range. For example, to an aqueous mixture, at a temperature of about 0° C., and having a sodium chloride to potassium chloride weight ratio of about 3.0, sufficient ammonia would be added to obtain a concentration in the final solution, for example, about 20 percent, which corresponds to about 25 pounds ammonia added to 100 pounds of original feed mixture; whereas, in a mixture having a chloride ratio of about 1.76 at 25° C. sufficient ammonia would be added to obtain a concentration of about 35 percent in the final solution which corresponds to about 54 pounds of ammonia added to the feed mixture.

The recovered solid potassium chloride product can be separated from the ammoniacal mixture as by filtration. This normally is carried out under elevated pressure to prevent loss of ammonia. The ammonia-laden filtrate may be directed into a thermal stripping device wherein the ammonia content is removed by heating, then collected, and subsequently compressed and recycled for use again in the ammoniation step. The filtrate so-denuded of ammonia has no further use in the present process and may be discarded, or subjected to other processing for recovery of other values contained therein.

The so-recovered solid potassium chloride, being normally about 85 percent pure, ordinarily is washed at a temperature of from about 0° C. to about 50° C., and preferably at about 20° C. to 30° C. with water or preferably water containing up to 28 percent by weight $NH_4OH$ to remove the impurities. The principal impurities are those of the mother liquor which adhere to the solid product. By washing in this manner potassium chloride having a purity of at least about 93 percent may be obtained.

The washings obtained on purifying the recovered potassium chloride are preferably sent to the ammoniator along with fresh feed material so as to recover residual potassium chloride and ammonia values from the washings.

By operating the process of the present invention under the preferred conditions as above stated optimum recovery of the available potassium chloride in the aqueous feed mixture employed can be obtained, substantially free from sodium chloride, in yields ranging up to about 95 percent depending upon the concentration of the feed material and degree ammoniation.

Any cooling needed during ammoniation can be supplied by a commercially available refrigeration unit, for example, by immersing the coils thereof into the bath, as described below, in which the ammoniation reactor is maintained. For a reactor temperature of about 25° C., however, sufficient cooling and control can usually be accomplished by, for example, a tap water coolant line. At lower temperatures, the above mentioned refrigeration unit or, for example, solid carbon dioxide will be needed.

As aforesaid, aqueous feed solutions saturated with respect to both chlorides at any given temperature within the ranges specified are preferred in operating the process of the present invention. It is not necessary, however, that all of the sodium chloride in the aqueous feed mixture will be soluble to operate the process since the feed mixture may, and preferably will, contain excess solid sodium chloride available for solution as ammoniation proceeds. This may be readily seen by reference to the appended drawings, specifically FIG. 1, wherein at any particular temperature and ammonia concentration, within the scope of the invention, the aqueous solution is incapable of satisfying the solubility of sodium chloride demanded by the system when in the presence of ammonia. Accordingly said solid sodium chloride will be available for solution.

It should be understood that feed solutions dilute with respect to said chlorides may also be employed. The degree of diluteness of the feed solution permitted in order to recover at least some potassium chloride depends on the concentration of ammonia and sodium chloride at the given temperature of operation and the amount of KCl in excess of its solubility under these conditions. Operating the present process at less than saturation, however, is economically inexpedient, therefore, not preferred.

Once the potassium chloride and sodium chloride content of the feed material is known, the amount of water and ammonia to add to obtain a maximum yield of potassium chloride free of solid sodium chloride may be readily determined by one having ordinary skill in the art in accordance with the present invention. The particular temperature used will be one merely of choice dictated by economics and the equipment at hand.

An ideal source of a feed material for use in the present invention is the naturally occurring solid mixture commonly known as Sylvinite which contains typically about 46 percent of potassium chloride and about 52 percent of sodium chloride. If employed, it is normally first crushed to a nominal size capable of being retained on, for example, about a number 3 to a number 12 screen (U.S. Standard Sieve Series, Fine) and then dissolved in sufficient water to dissolve all the potassium chloride leaving undissolved, if any, not more sodium chloride than up to 10 percent by weight of the so-formed solution. The so-prepared solution is then filtered to remove any grit, gypsum, carnallite, or foreign material and the filtrate introduced into an ammoniator or into a storage facility for subsequent treatment. In the event, however, that the Sylvinite ore used as a feed material to the process is low in impurities, such as grit, clay, gypsum, and the like, it is not necessary to filter the so-prepared aqueous slurry prior to ammoniation.

It should be understood that in order to obtain the desired degree of ammoniation and efficiency in operating the process, it is normally necessary to accomplish ammoniation under pressure to confine the ammonia in the solution being treated. In such a case, an ordinary pressurizable closed reactor vessel, as used in Example II hereinafter, capable of safely maintaining the required ammoniation pressure is used.

The following examples will serve to further illustrate the operation of the present invention but are not intended to limit the invention thereto.

*Example I*

About 100 grams of a feed solution containing 19.7 grams NaCl, 11.5 grams KCl, 69.0 grams $H_2O$ at about 25° C. was prepared and placed in a securely stoppered one-liter, round bottom, three necked flask as an ammoniation reactor. This reactor was then immersed in a 15 gallon constantly stirred water bath maintained at about 25° C. Agitation in the flask was provided by a motor driven paddle mixer, the stem of which extended into the solution through one of the necks of the flask. The entire system was at atmospheric pressure. A sufficient amount of liquid ammonia was then introduced through a bubbler at about 1 gram per minute in to the feed solution to obtain a concentration thereof in the final ammoniacal composition of about 27 percent by weight, thereby producing an ammoniacal slurry containing solid potassium chloride. During the ammoniation, samples were periodically withdrawn from the flask by a pipette and the ammonia concentration of the solution phase determined by back titration in HCl using NaOH, and methyl red as an indicator. When the titrations showed that about 35 grams of $NH_3$ has been added, the ammonia supply was shut off and the system allowed to come to equilibrium by letting it stand for about 2 hours. The slurry of KCl in the ammoniacal solution was then filtered under a low pressure to recover the solid KCl therefrom. The potassium chloride so-recovered, being wet with mother liquor, was about 87 percent pure and amounted to about 60 percent of the available KCl in the original feed solution. After washing the so-recoverd wet potassium chloride with a 28 percent $NH_4OH$ aqueous solution at a temperature of about 50° C. and drying, the purity was increased to about 98 percent on a dry weight basis.

*Example II*

Using another 100 gram sample of the same feed solution as that used in Example I, a sufficient amount of liquid ammonia was admixed therewith in a pressure reactor at a temperature of about 25° C. to produce an ammonia concentration in the solution of the resulting potassium chloride ammoniacal of about 40 percent by weight thereof, that is, about 61 grams. In this case, the ammonia pressure attained in the reactor was about 38 p.s.i.g. Sampling for ammonia content was accomplished by discharging from the reactor the desired amount of sample and titrating as above for the ammonia content determination. On separating, washing, and drying the so precipitated KCl from the slurry about 71 percent of the available KCl was recovered having a purity of about 97 percent on a dry weight basis.

*Example III*

This example illustrates the application and operation of the process of the present invention using Sylvinite ore as a feed material.

About 100 grams of Sylvinite ore was crushed into particles having a size such that substantially all were of a size capable of being retained on a number 12 mesh screen (U.S. Standard Sieve Series). The so-crushed ore containing about 52 percent potassium chloride and about 46 percent sodium chloride (the balance being, for example, surface water, grit, clay, gypsum, and other foreign material) was slurried with about 124 grams of water. The so-prepared slurry was transferred to a pressure ammoniation reactor.

About 123 grams of gaseous ammonia was bubbled into the slurry while the temperature thereof was maintained at about 25° C. Thereafter the system was allowed to equilibrate by letting it stand for about 2 hours. The resulting ammoniacal slurry containing potassium chloride precipitated by the ammonia was then filtered under pressure and the solid potassium chloride recovered therefrom producing a yield on a dry weight basis of about 94 percent of the available potassium chloride.

*Example IV*

The flow chart of FIG. 3 of the appended drawings illustrates the present novel process as applied to recovering potassium chloride on a tons-per-day basis from a feed brine derived from solution mining Sylvinite ore such as, e.g., those solutions obtained by the solution mining of Sylvinite deposits as described in U.S. Patent 3,058,729. With reference to said chart, 8292 tons per day of a feed brine (A) at 45° C. containing initially (90 percent of saturation), 13.4 percent of potassium chloride and 18.8 percent sodium chloride, the balance being essentially water and minor amounts of other salts, is evaporated (B) at 100° C. to saturation, whereupon, 2450 tons and 688 tons per day of water and sodium chloride, respectively, are expelled and discarded. The saturated brine remaining is thereafter cooled to 25° C. and ammoniated (C) with a total of 2606 tons of ammonia containing 26 tons of water and the so-ammoniated brine (7760 tons per day) sent to a settling tank, (D) for an inventory time in said tank of, for example, about ½ hour. The solid KCl is then separated (E) from the brine, and recovered (1000 tons per day), whereupon, it may be washed, if desired, and sent to a drier (F). The liquid phase of the brine is then sent to a stripper (G) for recovery of the ammonia values, which are in turn supplemented and recycled back to the ammoniator (C) for use.

*Example V*

To indicate that the present process may also be operated when the system is not saturated in respect to sodium chloride at any particular ammonia concentration and at any particular temperature, FIG. 4 of the drawing shows that the solubility of potassium chloride merely increases slightly, compared to those of FIG. 1, indicating that a larger ammonia concentration is required than when a saturated feed solution is employed.

With respect to saturated solutions, as aforesaid, the curves in FIG. 1 show the solubility behavior of sodium chloride and potassium chloride in aqueous ammonia solutions at various temperatures. These solubility curves were determined by equilibrating and sampling the system $NaCl-KCl-NH_3-H_2O$ saturated in respect to sodium chloride and potassium chloride at various ammonia concentrations and at various temperatures. The samples were analyzed for $NH_3$ by drawing 5 ml. portions into hydrochloric acid then back titrating with NAOH using methyl red as an indicator. Duplicate samples were analyzed for salt content by drawing them into distilled water, evaporating to dryness to determine percent total salt, then titrating by the Volhard method for total chloride, whereupon, the amount (grams) of both NaCl and KCl per gram of water in the system was determined. When compared to FIG. 2, the curves of FIG. 1 clearly show the surprising solubility increases of NaCl from that in the $NH_3$-free system, in addition to showing the suppressed solubility of potassium chloride.

It is manifest that various modifications can be made in the process of the present invention without departing from the spirit or scope thereof and it is understood that we limit ourselves only as defined in the appended claims.

We claim:

1. A process for recovering solid potassium chloride from water-soluble compositions containing primarily both sodium chloride and potassium chloride which comprises, admixing ammonia with an aqueous mixture containing sodium chloride and potassium chloride to produce a final ammoniacal solution having a concentration by weight of from about 30 to about 45 percent of ammonia and a temperature of from about 0° to about 50° C., thereby to precipitate solid potassium chloride in said reaction mixture and separating said solid potassium chloride from said reaction mixture.

2. The process of claim 1 including the step of washing the separated potassium chloride.

3. The process of claim 2 wherein the washing is done with water at a temperature of from about 0° C. to about 50° C.

4. The process of claim 3 wherein the wash water contains up to about 28 percent by weight ammonium hydroxide.

5. The process of claim 1 wherein the initial aqueous mixture is saturated with respect to sodium chloride and potassium chloride.

6. The process of claim 5 wherein the initial aqueous mixture of said sodium chloride and potassium chloride contains up to about 10 percent by weight of solid undissolved sodium chloride.

7. The process of recovering solid potassium chloride from Sylvinite ore which comprises, crushing said ore, leaching said crushed Sylvinite ore with an amount of water sufficient to dissovle substantially all potassium chloride values to form an initial aqueous mixture as a feed material comprising primarily sodium chloride and potassium chloride, introducing ammonia into said initial aqueous mixture to provide a final ammoniacal solution having a concentration of from about 30 to about 45 percent by weight in said final solution and a temperature of from about 0° to about 50° C., thereby to produce a solid precipitate of potassium chloride and an ammoniacal sodium chloride solution, and separating the solid precipitate from the ammoniacal solution.

8. The process of claim 7 wherein the initial aqueous mixture into which the ammonia is introduced is saturated with respect to both sodium chloride and potassium chloride.

9. The process of claim 7 wherein the initial aqueous mixture contains up to about 10 percent by weight solid undissolved sodium chloride.

References Cited by the Examiner

UNITED STATES PATENTS

| | | | |
|---|---|---|---|
| 1,510,046 | 9/1924 | Dolbear | 23—300 |
| 1,593,038 | 7/1926 | Silsbee | 23—302 |
| 1,859,835 | 3/1932 | Mitteau | 23—300 |

FOREIGN PATENTS

| | | |
|---|---|---|
| 271,869 | 8/1928 | Great Britain. |
| 331,236 | 3/1929 | Great Britain. |

OTHER REFERENCES

Comey and Hahn; "A Dictionary of Chemical Solubilities," 2nd edition, New York, The MacMillan Co., 1921 (pp. 745,752 and 844).

Distanov et al.: Nauch Zapiski Vzhgorod Univ. 7, pages 161–8 (1953), Referat. Zhur. Khim.

Gilliot: Bull. Soc. Chim., France, 1951, pages 992 to 1002.

Yatlov: J. Chem. Ind., U.S.S.R., 1930, 7, pages 752 to 759.

NORMAN YUDKOFF, *Primary Examiner.*

S. J. EMERY, *Assistant Examiner.*